United States Patent [19]

Takagaki

[11] Patent Number: 5,078,817
[45] Date of Patent: Jan. 7, 1992

[54] PROCESS FOR PRODUCING PRINTED CONTAINER FOR FOOD PACKAGING

[75] Inventor: Tadao Takagaki, Takarazuka, Japan

[73] Assignee: Sumitomo Bakelite Company Limited, Tokyo, Japan

[21] Appl. No.: 546,815

[22] Filed: Jul. 2, 1990

[30] Foreign Application Priority Data

Jul. 12, 1989 [JP] Japan .................................. 1-178169
Jul. 28, 1989 [JP] Japan .................................. 1-193952
Oct. 27, 1989 [JP] Japan .................................. 1-280815

[51] Int. Cl.⁵ .......................................... B32B 31/26
[52] U.S. Cl. .................................. 156/73.1; 156/85; 156/86; 156/272.2; 264/230; 264/342 R
[58] Field of Search ............... 156/85, 86, 73.1, 272.2, 156/379.6, 580.1; 264/230, 342 R

[56] References Cited

U.S. PATENT DOCUMENTS

| | | | |
|---|---|---|---|
| 3,542,229 | 11/1970 | Waltenhofer et al. | 156/86 |
| 3,698,586 | 10/1972 | Terner | 156/86 |
| 3,749,621 | 7/1973 | Shoffnen | 156/86 |
| 4,025,378 | 5/1977 | Amsden | 156/86 |
| 4,983,238 | 1/1991 | Yoshida et al. | 156/244.11 |

FOREIGN PATENT DOCUMENTS 0313406 4/1989 European Pat. Off. .
2604215 8/1976 Fed. Rep. of Germany .
1347102 11/1962 France .
2186213 8/1987 United Kingdom .

*Primary Examiner*—Caleb Weston
*Attorney, Agent, or Firm*—Browdy and Neimark

[57] ABSTRACT

A printed container for food packaging, particularly a heat-resistant printed container for food packaging which can be subjected to heat sterilization and heat cooking, can be produced by a process which comprises winding, around the side of a container main body, a label consisting of a transparent heat-shrinkable resin film having a cylindrical shape whose circumference is slightly larger than the circumference of said side and further having a print at the inner side, and then carrying out:

a step of subjecting said heat-shrinkable resin film to heat shrinkage, and
a step of melt-bonding a part of the heat-shrinkable resin film to the container main body.

7 Claims, 5 Drawing Sheets

C: LOWER END OF INNERMOST PORTION OF DENT
C′: UPPER END OF INNERMOST PORTION OF DENT

FIG. 1a

- 1 CONTAINER MAIN BODY
- 2 LABEL
- 3 PRINT
- 4 BOTTOM PORTION

FIG. 1b

- 8 ADHESIVE

FIG. 1c

- 10 CONTAINER MAIN BODY
- K CONTAINER BOTTOM
- H FLANGE

C: LOWER END OF INNERMOST PORTION OF DENT
C': UPPER END OF INNERMOST PORTION OF DENT

H: FLANGE
K: CONTAINER BOTTOM
C: LOWER END OF INNERMOST PORTION OF DENT
C': UPPER END OF INNERMOST PORTION OF DENT

FIG. 3a

TOP END 6
BOTTOM END 7

FIG. 3b 6
7
8 ADHESIVE
3 PRINT
8

FIG. 3c

20 SHRINKABLE FILM HAVING A PRINT AT THE INNER SIDE

21 JOINT PORTION OF SHRINKABLE FILM

H: FLANGE
K: CONTAINER BOTTOM
C: LOWER END OF INNERMOST PORTION OF DENT
C': UPPER END OF INNERMOST PORTION OF DENT

C2–C8: INNERMOST PORTIONS OF DENTS

PROCESS FOR PRODUCING PRINTED CONTAINER FOR FOOD PACKAGING

The present invention relates to a process for producing a printed container for food packaging, particularly a heat-resistant printed container for food packaging which can be subjected to heat sterilization (e.g., boiling and retorting) and heat cooking as well as to said container.

Packed foods which can be subjected to heat sterilization and heat cooking as they are, have been commercially available.

Generally in displaying and selling packed foods at supermarkets, etc., applying printing to the side of a food package is important for sales promotion of the packed foods because the printing on the side is most eye-catching.

Containers for food packaging are usually formed by vacuum molding, air-pressure forming, blow molding, injection molding, etc. Even when they are formed by vacuum molding or air-pressure forming, it is not practical to apply printing to a material sheet beforehand because the printed pattern applied on the material sheet undergoes large deformation during the forming of containers.

A method of attaching a paper label to the side of a container is also known. Packed foods obtained by this method, when subjected to heat sterilization, heat cooking, etc., are often splashed with hot water or water, allowing the printed paper of low water resistance to break or get wet and impair the clean image of the container.

As the method for applying printing to the side of a formed container, there are firstly a method of applying curved surface printing to the side wall of a container, and secondly a method of attaching a printed shrinkable film to the side of a container with an adhesive and then heating them to fix the film to the container side by the shrinking power of the film and the adhesive strength of the adhesive.

The first method has drawbacks in that the printing ink has no sufficient heat resistance, multi-color printing is difficult due to the printing technique adopted, and accordingly it is unable to obtain a print of high quality feeling, and further when the side of the container has dent(s), it is difficult to apply printing to the dent(s) of the curved surface. The second method has drawbacks in that the adhesive loses its adhesive strength when heated and the film is detached during heating and further when the container has dent(s) at the side, it is unable to attach the shrinkable film to the dent(s).

The present invention is intended to solve the drawbacks of conventional printed containers for food packaging and to provide a container for food packaging which can maintain its beautiful printed side even when subjected to heat treatments such as heat sterilization, heat cooking and the like, as well as to a process for producing said container.

According to the present invention, there is provided a process for producing a printed container for food packaging, comprising:

winding, around the side of a container main body, particularly a container main body whose at least outermost layer consists of a heat-resistant resin layer having a heat deformation temperature of 80° C. or higher, a label consisting of a transparent heat-shrinkable resin film having a cylindrical shape whose circumference is slightly larger than the circumference of said side and further having a print at the inner side, and then carrying out:

a step of subjecting said heat-shrinkable resin film to heat shrinkage, and a step of melt-bonding a part of the heat-shrinkable resin film to the container main body.

The first preferable embodiment of the present invention is a process as mentioned above, wherein the heat-shrinkable resin film is melt-bondable to the heat-resistant resin layer by ultrasonic wave or high frequency and the melt-bonding step is effected by ultrasonic wave or high frequency after or simultaneously with the heat shrinkage step.

The second preferable embodiment of the present invention is a process as mentioned above, wherein a hot-melt adhesive is applied onto the whole area or part of the inner side of the heat-shrinkable resin film and the melt-bonding step is effected by ultrasonic wave or high frequency or by heat and pressure after or simultaneously with the heat shrinkage step.

The third preferable embodiment of the present invention is a process as mentioned above, wherein the container main body has dent(s) at the side, the heat-shrinkable resin film is melt-bondable to the heat-resistant resin layer of the container main body by ultrasonic wave or high frequency, the melt-bonding step is effected by ultrasonic wave or high frequency at the innermost portion(s) of the dent(s), and then the heat shrinkage step is effected.

The container intended by the present invention must have a side consisting of a resin layer melt-bondable to the heat-shrinkable film. When the container must withstand the heat shrinkage treatment for heat-shrinkable film and also heat treatments such as heat sterilization, heat cooking and the like, at least the outermost layer of the container main body must consist of a heat-resistant resin layer having a heat deformation temperature of 80° C. or higher.

The container main body satisfying such a requirement may consist of a single layer made of polyethylene, polypropylene, polyester, polycarbonate, polyvinyl chloride, chlorinated polyvinyl chloride, polystyrene or the like, but, when barrier properties are required therefor, preferably consists of a plurality of layers wherein the outermost layer is made of the above-mentioned resin, the intermediate layer is a resin layer of barrier properties made of saponification product of ethylene-vinyl acetate copolymer, polyvinylidene chloride or the like, or a metal layer made of aluminum or the like, and the innermost layer is made of a resin sealable to a lid.

The single resin layer of the container main body of the present invention, or the outermost resin layer when the container main body of the present invention is a multilayered sheet, must be melt-bondable to the heat-shrinkable film having a print at the inner side, used in the process of the present invention, by heat and pressure sealing, ultrasonic sealing or high frequency sealing. Accordingly, the container main body side or its outermost layer is preferably made of the same resin as constituting the heat-shrinkable film.

When the heat-shrinkable film is melt-bonded to the container main body more strongly, the whole area or part of the inner side of the cylindrical heat-shrinkable film is coated with a hot-melt adhesive before melt-bonding.

As the cylindrical heat-shrinkable transparent film having a print at the inner side, used in the process of the present invention, there can be used a film made of the same resin as constituting the side of the container main body, for example, polypropylene film, polycarbonate film, polyester film, polyvinyl chloride film, chlorinated polyvinyl chloride film polystyrene film or the like.

When the container of the present invention needs to have a heat-insulating property, there is used a cylindrical label obtained by laminating a foamed shrinkable polypropylene to a film (e.g., a polypropylene film) having a print at the inner side.

In the process of the present invention, these films are mono- or biaxially stretched to impart a heat-shrinking property and then used.

Particularly when a monoaxially stretched film is shaped into a cylindrical film so that the stretching direction of the former agrees with the circumferential direction of the latter, there can be eliminated slackening when the film has been wound around the side of the container main body. Therefore, the formation of a cylindrical film in the above manner is effective and desirable.

The heat-shrinkable film used in the process of the present invention has a print at the inner side beforehand. In the process of the present invention, the film is fixed to the side of the container main body so that the printed side of the film faces the side of the main body. The fixing of the film in such a manner (i.e., the non-printed side of the film is not fixed and is exposed to the air) is desirable, because it assures the stability of the print to water treatment, heat sterilization and heat cooking, the clean image of the container and the adhesion between the printing ink and the main body side. Further, the heat-shrinkable film having a print at the inner side is transparent and has surface gloss, and accordingly can have a high commercial value. Printing of the film at the inner side can be effected by gravure printing, offset printing, etc. conventionally used.

When printing is necessary at the bottom of the container main body, preferably there is attached, to the bottom, a transparent resin film having a print at the inner side, which is melt-bondable to the cylindrical label by heat and pressure or by ultrasonic wave or high frequency and which has a heat resistance of 80° C. or more.

In the process of the present invention, the heat-shrinkable film is used in a cylindrical shape.

It is convenient from the operational standpoint that the film be made into a cylindrical shape before it is wound around the container main body. However, it is also possible that the shrinkable film of rectangular shape be wound around the side of the container main body and made into a cylindrical shape on the main body. When the side of the container main body has dent(s), it is convenient that the two ends of the shrinkable film be overlapped at the innermost portion(s) of the dent(s) and the overlapping portion of the film be melt-bonded to the container main body, because it can reduce the times of melt-bonding to only one time and moreover the melt-bonded portion(s) is (are) hidden in the dent(s) and accordingly not noticed easily.

The dimension of the cylindrical shrinkable film used in the process of the present invention can be selected so as to agree with the dimension of the container main body.

The height of the cylindrical shrinkable film is ordinarily made nearly the same as that of the side of the container main body, but any desired height can be selected.

In some cases, it is preferable in view of the appearance of the container obtained that the height of the cylindrical shrinkable film be slightly larger than the height of the side of the container main body so that the film can cover a part of the bottom of the container main body.

The circumference of the cylindrical film used in the process of the present invention can be 102–110% of the maximum circumference of the outer side of the container main body.

When the circumference of the cylindrical film is too small, it is difficult to carry out the operation of inserting a premade cylindrical film around the container main body, or the operation of overlapping the two ends of a rectangular film on the container main body. When said circumference is too large, the print formed on the inner side of the film is deformed during the heat shrinkage step.

The shrinkage factor of the shrinkable film used in the process of the present invention is 5–55%, preferably 10–50% at a treating temperature of about 90°–120° C. When the shrinkage factor is low, the intimate contact between the container main body and the shrinkable film is insufficient and the beauty of the print is impaired. When the circumference of the shrinkable film is not sufficiently large as compared with the circumference of the container main body and yet the shrinkage factor of the shrinkable film is too high, the container main body may be deformed.

The container main body used in the process of the present invention may have dent(s) at the side.

Figure 1A:
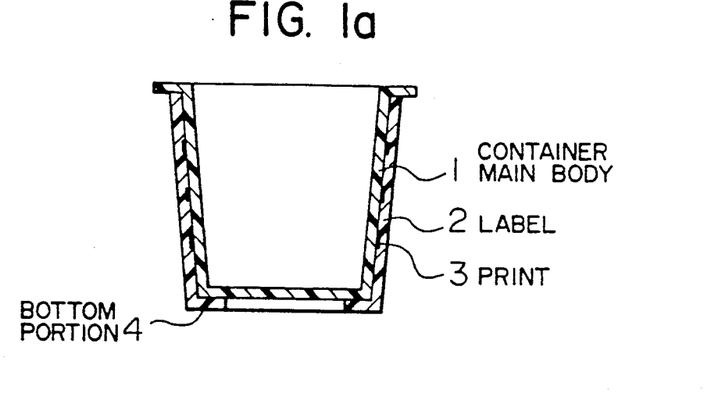
FIGS. 1a and 1b are each a sectional view of a container according to the present invention.
Figure 1B:
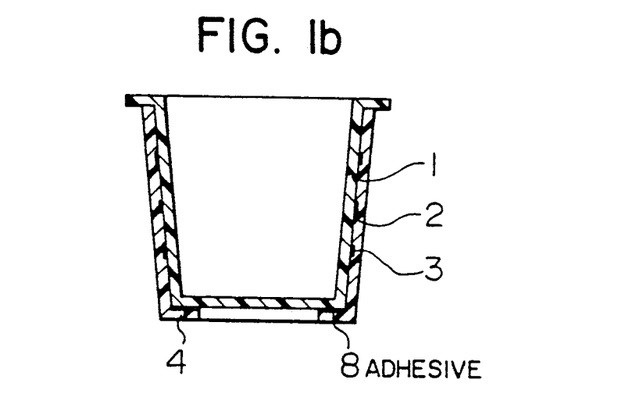
Figure 1C:
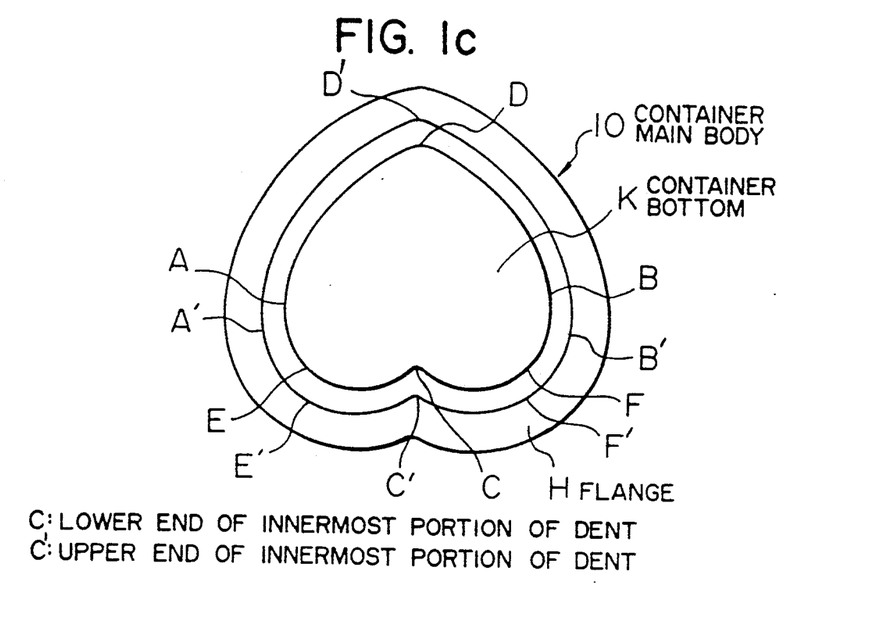
FIG. 1c is a bottom view of an example of the container main body used in the present process.
Figure 6:
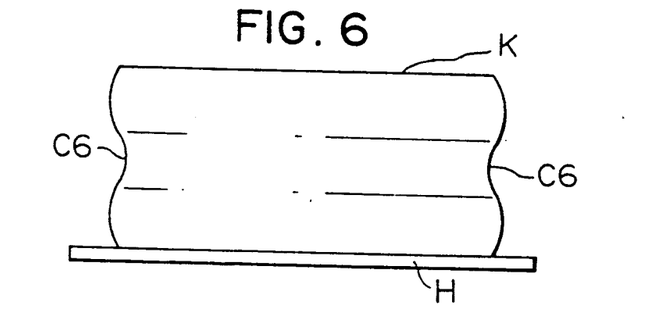
FIG. 6 is a side view of still another example of the container main body.

The container main body having dent(s) at the side, used in the process of the present invention includes, for example, one whose contents-accomodating portion has a heart shape as shown in the bottom view of FIG. 1c, and one whose contents-accomodating portion has a gourd shape as shown in the side view of FIG. 6. The container main body having dent(s) at the side, used in the process of the present invention is not restricted to these and further includes those which have, at the side, one or more dents of various shapes (e.g., lengthwise, crosswise, oblique).

As the melt-bonding means used in the process of the present invention, ultrasonic melt-bonding or high frequency melt-bonding is most suitable because they give no excessive heat shrinkage to the shrinkable film. The high frequency melt-bonding is applicable particularly to a vinyl chloride resin film.

In the heat shrinkage step, it often occurs that the shrinking power of the film is concentrated at one particular portion, for example, the joint portion of the film, causing the partial deformation of the container. This deformation can be avoided by coating the outer side of the container main body or the inner side of the shrinkable film with a heat-sensitive adhesive capable of exhibiting its adhesive strength at approximately the shrinking temperature of the shrinkable film (e.g., about 80°-100° C.), for example, rosin, rosin derivative, pinene type resin, petroleum resin, low-molecular polyolefin, crystalline wax or the like. Such an adhesive exhibits no adhesive strength while the cylindrical film is being fit to the container main body, but during the heat shrinkage, enables the complete adhesion of the film to the entire outer surface of the container main body to thereby dissipate the shrinking power of the film uniformly on the entire outer surface of the container main body and prevent the deformation of the container. The presence of such an adhesive between the resin layer of the film and the container main body does not hinder the melt-bonding of these resin layers by ultrasonic wave or high frequency; therefore, in the melt-bonding by ultrasonic wave or high frequency, the bonding strength at the innermost portion(s) of the dent(s) is not reduced by the presence of the above adhesive.

It is convenient to allow the inner side of the cylindrical shrinkable film to have a print over a large area, because the printing ink layer formed on the film acts like a heat-sensitive adhesive and thereby serves to dissipate the shrinking power of the film as mentioned above. In order to enhance this dissipation effect, it is possible to use a printing ink containing a heat-sensitive adhesive.

The process of the present invention is described more specifically by way of Examples, referring to the accompanying drawings.

EXAMPLE 1

Figure 2A:
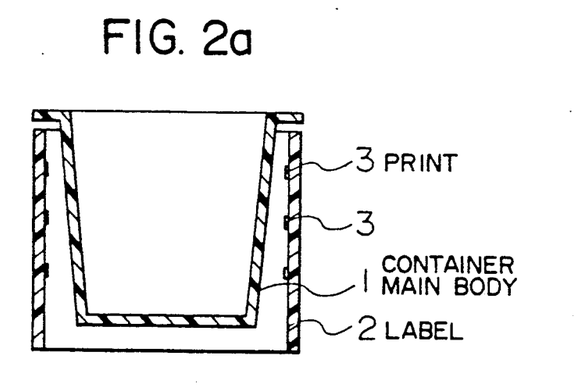
FIGS. 2a and 2b are each a sectional view showing the production process of the present invention.

As shown in FIG. 2a, a cylindrical label 2 having a circumference of 178 mm and a height of 82 mm obtained by melt-bonding, by ultrasonic wave, the both ends of a transparent monoaxially stretched polypropylene film having a shrinkage factor of 50% at 100° C. and a thickness of 50μ and having a photoprint 3 at the inner side, was fit to a multilayered container main body 1 having a neck bottom diameter of 55 mm, a bottom diameter of 42 mm and a height of 79 mm obtained by subjecting to vacuum molding a polypropylene/saponification product of ethylene-vinyl acetate copolymer/polypropylene multi-layered sheet; they were allowed to stand for 20 seconds in an atmosphere of 120° C. to completely bring the cylindrical label into intimate contact with the container main body; then, the bottom portion 4 of the cylindrical label was melt-bonded to the container main body 1 under pressure for 0.2 second by an ultrasonic welder of 20 KHz; thereby, a printed container could be obtained wherein a cylindrical label had been melt-bonded completely to a container main body 1, as shown in FIG. 1a.

Figure 4A:
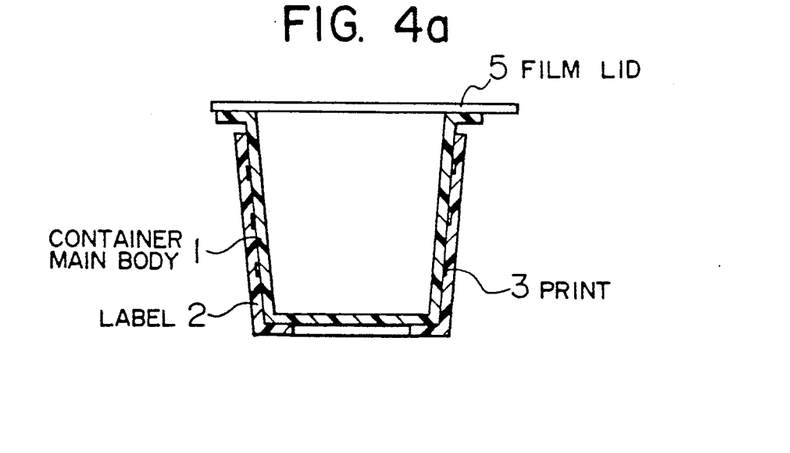
FIGS. 4a and 4b are each a sectional view showing a state that the container according to the present invention has been filled with contents and that a lid film has been heat-sealed thereto.

The printed container was filled with contents (e.g., soft azuki-bean jelly) and then heat-sealed with a lid 5 made of a multi-layered film (e.g., nylon/polypropylene film) of 80μ in thickness, as shown in FIG. 4a; the sealed container was subjected to retort sterilization of, for example, 120° C.×20 minutes but maintained original beauty of the print.

Figure 3A:
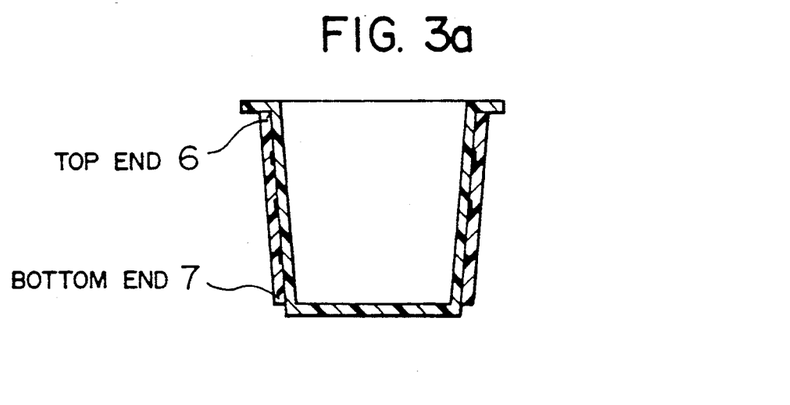
FIGS. 3a and 3b are each a sectional view of a container according to other embodiment of the present invention.

Similarly to the case of FIG. 2a, as shown in FIG. 3a a cylindrical label 2 having a circumference of 178 mm and a height of 80 mm, made of a monoaxially stretched polypropylene film was fit to the same container main body 1 as used above; they were allowed to stand for 20 seconds in an atmosphere of 100° C. and were melt-bonded to each other by ultrasonic wave at the top end 6 and bottom end 7 of the cylindrical label 2 to obtain a printed container. The container was filled with contents and then completely sealed with the same film lid 5 as used above; the sealed container was sterilized in hot water of 100° C. for 30 minutes but showed no change. Thus, the container had a high commercial value.

Also, a container main body 1 and a cylindrical label 2 were simply heat-sealed using no ultrasonic welder. In this case, the label was cut and broken and no container of commercial value could be obtained.

EXAMPLE 2

Figure 2B:
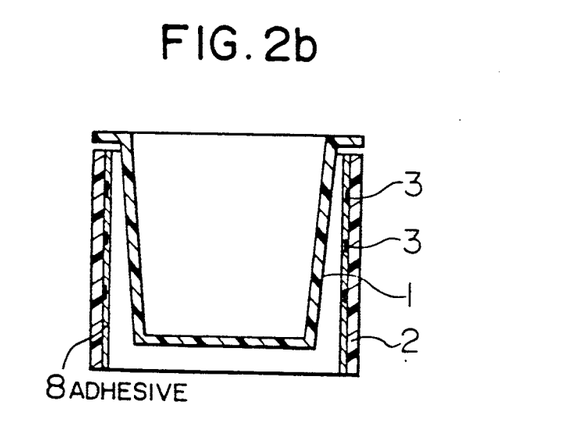

As shown in FIG. 2b, a cylindrical label 2 having a circumference of 178 mm and a height of 82 mm obtained by sealing the both ends of a transparent monoaxially stretched polypropylene film having a shrinkage factor of 50% at 100° C. and a thickness of 50μ and having a photoprint 3 at the inner side and further having, at the inner surface, a hot-melt adhesive of ethylene-vinyl acetate copolymer type coated on the entire surface in a thickness of 5μ, was fit to a multi-layered container main body 1 having a neck bottom diameter of 55 mm, a bottom diameter of 42 mm and a height of 79 mm obtained by subjecting to vacuum molding a polypropylene/saponification product of ethylene-vinyl acetate copolymer/polypropylene multi-layered sheet; they were allowed to stand for 20 seconds in an atmosphere of 120° C. to completely bond the cylindrical label to the container main body; then, the bottom portion 4 of the cylindrical label was melt-bonded to the container main body 1 under pressure for 0.2 second by an ultrasonic welder of 20 KHz; thereby, a printed container could be obtained wherein the cylindrical label 2 was melt-bonded completely to the container main body 1, as shown in FIG. 1b.

Figure 4B:
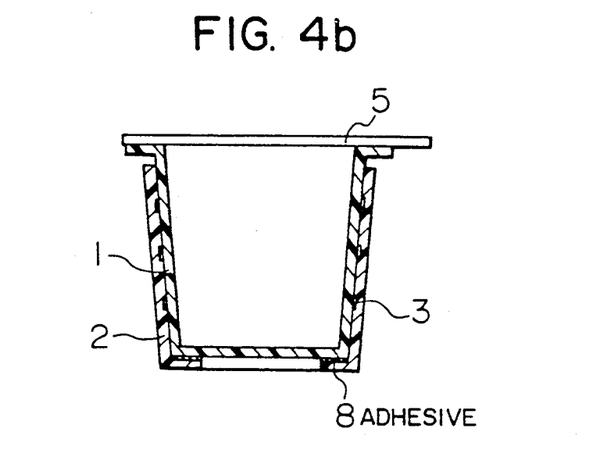

The printed container was filled with contents (e.g., soft azuki-bean jelly) and then heat-sealed with a lid 5 made of a multi-layered film (e.g., nylon/polypropylene film) of 80μ in thickness, as shown in FIG. 4b; the sealed container was subjected to retort sterilization of, for example 120° C.×20 minutes but maintained original beauty of the print.

Figure 3B:
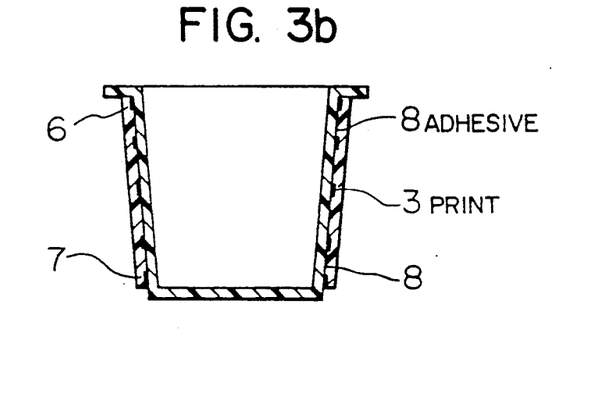

Similarly to the case of FIG. 2b, a cylindrical label 2 having a circumference of 178 mm and a height of 80 mm, made of a monoaxially stretched polypropylene film was fit to the same container main body 1 as used above; they were allowed to stand for 20 seconds in an atmosphere of 100° C. and were melt-bonded to each other under pressure for 0.2 second by an ultrasonic welder of 20 KHz at the top end 6 and bottom end 7 of the cylindrical label 2 to obtain a printed container as shown in FIG. 3b. The container was filled with contents and then completely sealed with the same film lid 5 as used above; the sealed container was sterilized in hot water of 100° C. for 30 minutes but showed no change. Thus, the container had a high commercial value.

Also, a container main body 1 and a cylindrical label 2 having no adhesive coated thereon were sealed under heat and pressure. In this case, the label was cut and broken and no container of commercial value could be obtained.

EXAMPLE 3

Figure 2C:
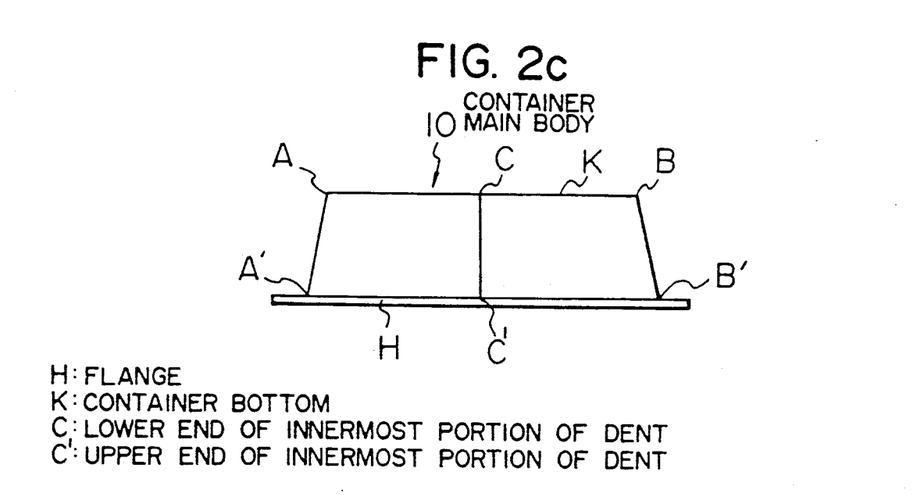
FIG. 2c is a side view of the main body.

A heart-shaped container main body 10 is shown in FIG. 1c (a bottom view) and FIG. 2c (a side view). The height of the side is 22 mm; in the heart-shaped bottom of FIG. 1c, the lengths of AB, CD, EF and DF are 62 mm, 48 mm, 33 mm and 58 mm, respectively; at the top portion of the container main body adjacent to the flange, the length of A'B' corresponding to the AB length of the bottom is 67 mm, and other lengths C'D', E'F' and D'F' are larger than the corresponding bottom lengths CD, EF and DF in the same proportion as A'B'/AB, and accordingly the top portion of the container main body adjacent to the flange also has a heart shape similar to the bottom.

The circumference of the side of the container main body is 104 mm at just beneath the flange and 92 mm at the bottom. The container main body has a flange H at the top to enable jointing with a lid.

The heart-shaped container main body of peeling type is made of a polypropylene/saponification product of ethylene-vinyl acetate copolymer/polypropylene three-layered laminate sheet of 0.6 mm in thickness. The three-layered laminate sheet was subjected to vacuum molding to obtain a container main body 10 shown in FIG. 1c and FIG. 2c.

Figure 3C:
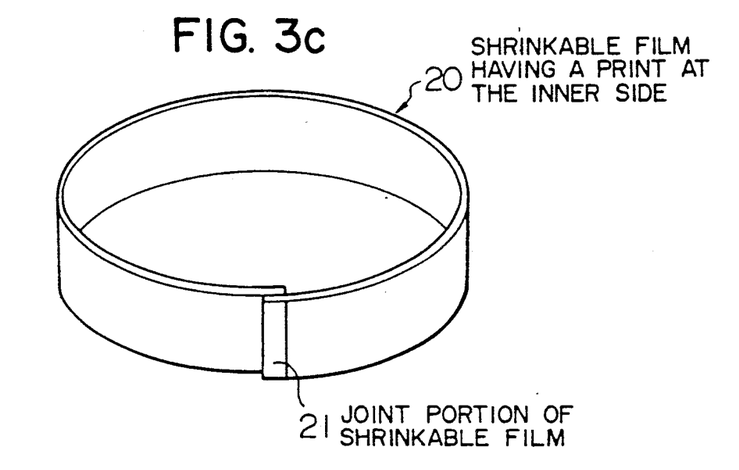
FIG. 3c is a perspective view of an example of the shrinkable film having a print at the inner side, used in the present process.

Separately, a rectangular monoaxially stretched polypropylene film of 22 mm×112 mm×50μ (thickness) having a shrinkage factor of 30% at 100° C. and also having a particular print was overlapped at the both ends by 4 mm so as to form a cylindrical shape with the print being positioned at the inner side of the cylinder, as shown in FIG. 3c. The overlapped portion 21 was subjected to heat sealing to prepare a cylindrical film 20 having a circumference of 108 mm as shown in FIG. 3c.

In this cylindrical film 20, the direction of stretching is made the same as the circumferential direction; therefore, the thermal shrinkage occurs mainly in such a way that the circumference is decreased.

The container main body 10 of FIG. 1c was continuously supplied onto a conveyor so that the top of the container main body came in contact with the conveyor; the dented portion of the heart-shaped container main body was mechanically detected to direct the dented portion to a particular direction so that the innermost line CC' of the dented portion could be faced to an ultrasonic sealer; then, the cylindrical shrinkable film 20 prepared above was fit to the container main body 10 so that the sealed joint portion 21 of the film could be contacted exactly with the line CC' of the dented portion of the container main body.

Figure 4C:
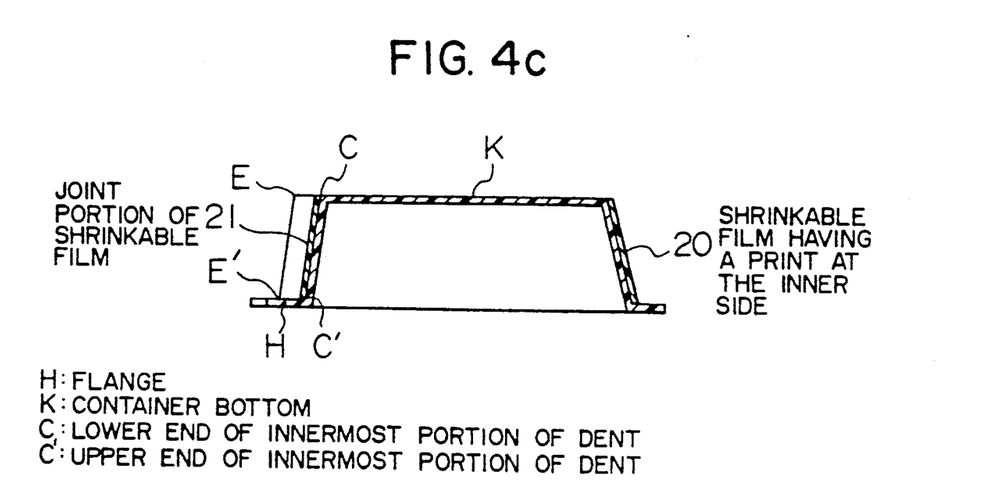
FIG. 4c is a sectional view of a heart-shaped container as an example of the container for food packaging produced by the present process, wherein the container has been cut by a plane perpendicular to the container bottom and including the innermost point C and the point D both of FIG. 1c.

Thereafter, the joint portion 21 of the shrinkable film and the line CC' of the container main body were melt-bonded to each other by ultrasonic wave; the resulting container was removed from the ultrasonic sealer; the container was then introduced into a heating tunnel by a conveyor; in the tunnel, the shrinkable printed film was heated by hot air to shrink it and bring it into intimate contact with the container main body; thereby, a printed container for food packaging having a sectional structure as shown in FIG. 4c was produced.

The resultant container of FIG. 4c was filled with a food and sealed with a lid at the flange H. The sealed container could be heat-sterilized with no change in container appearance and then was delivered, displayed and sold.

EXAMPLE 4

Figure 5:
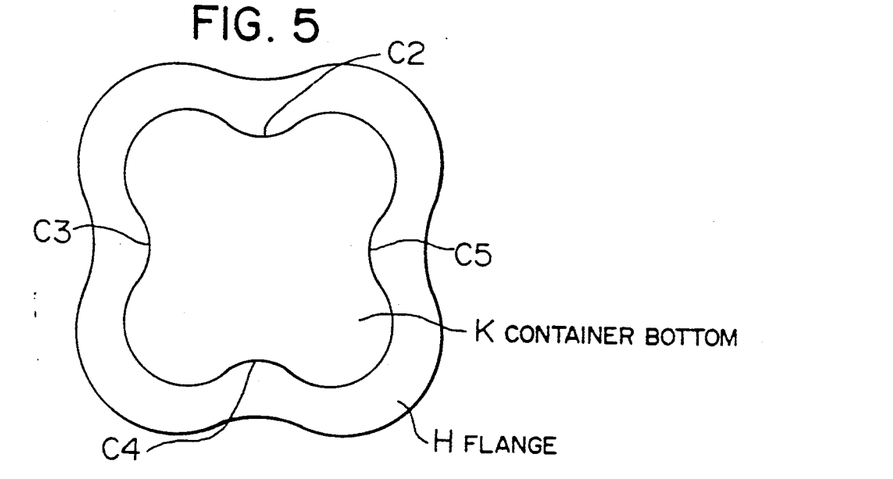
FIG. 5 is a bottom view of another example of the container main body used in the present invention.

In the same manner as in Example 3, the process of the present invention was applied to a container main body having four dents C2, C3, C4 and C5 at the side and accordingly having a quatrefoil-shaped bottom view as shown in FIG. 5. In this case, each dent has its innermost portion (total four innermost portions); therefore, a cylindrical shrinkable film was melt-bonded by ultrasonic wave to the side of the container main body at the four innermost portions each extending from right beneath the flange to the bottom. Other operational steps were conducted in the same manner as in Example 3.

EXAMPLE 5

In the same manner as in Example 3, the process of the present invention was applied to a container main body as shown in FIG. 6 (a side view), having a dent at the middle of the side. In this case, a printed shrinkable film was melt-bonded to the container main body at the innermost portion C6 of the dent (C6 forms a circumference), and the film had been stretched perpendicularly to its circumferential direction.

EXAMPLE 6

Figure 7:
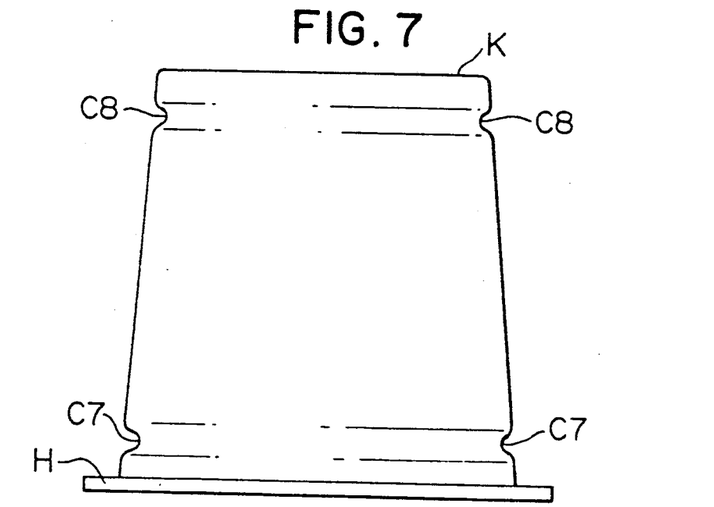
FIG. 7 is a side view of yet another example of the container main body.

In the same manner as in Example 3, the process of the present invention was applied to a container main body as shown in FIG. 7 (a side view), having two shallow dents C7 and C8 at the side at locations close to the upper and lower ends (the dents are parallel to the upper and lower ends of the container main body). In this case, a printed shrinkable film was melt-bonded to the container main body at the innermost portions C7 and C8, and the film had been stretched biaxially. Then, a shrinkage step was effected, whereby the printed film could be very strongly fixed to the side of the container main body.

According to the processes of the present invention shown in Examples 1-6, a clean print could be applied to the side of each container main body. Each of the resulting containers, when subjected to heat sterilization or heat cooking after being filled with contents and sealed with a lid, showed no peeling of the printed film; thus, the printed side of each of the containers had high hot water resistance. Further, the present process could be effected continuously and accordingly gives a high production efficiency.

What is claimed is:

1. A process for producing a photo-printed heat resistant resin container for food packaging having a main body, comprising:

winding around the side of said container main body, a label consisting of a transparent heat-shrinkable resin film having a shrinkage factor of about 5 to about 55% at temperatures between 90°-120° C. and having a cylindrical shape whose circumference is slightly larger than the circumference of said side and further having a print at its inner side;

subjecting said heat-shrinkable resin film to heat shrinkage; and melt-bonding a part of the heat-shrinkable resin film to the container main body;

wherein at least an outermost layer of the side of the container main body consists of a heat resistant resin layer having a heat deformation temperature of 80° C. or higher; and wherein the heat-shrinkable resin film is melt-bondable to the heat resistant resin layer by ultrasonic wave and the melt-bonding step is effected by ultrasonic wave after or simultaneously with the heat shrinkage step.

2. A process according to claim 1, wherein the heat-shrinkable resin film comprises polypropylene, polyester, polycarbonate, polystyrene, polyvinyl chloride or chlorinated polyvinyl chloride.

3. A process according to claim 1, wherein the circumference of the cylindrical heat-shrinkable resin film is 102-110% of the maximum circumference of the side of the container main body.

4. A process according to claim 1 wherein the shrinkage factor of the heat-shrinkable film is 5-55% at a treatment temperature of about 90°-120° C.

5. A process according to claim 1, wherein the container main body has dent(s) at the side, the heat-shrinkable resin film is melt-bondable to the heat-resistant resin layer of the container main body by ultrasonic wave, the melt-bonding step is effected by ultrasonic wave at the innermost portion(s) of the dent(s), and then the heat shrinkage step is effected.

6. A process according to claim 1, wherein the heat-shrinkable resin film is a monoaxially stretched cylindrical film stretched in its circumferential direction.

7. A process according to claim 1, wherein the outermost layer of the container main body comprises polypropylene, polyester, polycarbonate or chlorinated polyvinyl chloride, an intermediate layer comprises a saponification product of ethylene-vinyl acetate copolymer, polyvinylidene chloride or aluminum metal, and an innermost layer comprises a resin sealable with a lid.

* * * * *